United States Patent [19]

Childs

[11] Patent Number: 4,630,120
[45] Date of Patent: Dec. 16, 1986

[54] TELECINE MACHINES

[75] Inventor: Ian Childs, Sutton, England

[73] Assignee: British Broadcasting Corporation, London, England

[21] Appl. No.: 563,399

[22] PCT Filed: Mar. 29, 1983

[86] PCT No.: PCT/GB83/00095
§ 371 Date: Nov. 30, 1983
§ 102(e) Date: Nov. 30, 1983

[87] PCT Pub. No.: WO83/03513
PCT Pub. Date: Oct. 13, 1983

[30] Foreign Application Priority Data

Mar. 30, 1982 [GB] United Kingdom ............... 8209327

[51] Int. Cl.[4] .............................................. H04N 9/11
[52] U.S. Cl. ...................................... 358/214; 358/54
[58] Field of Search ................... 358/214, 54, 44, 215, 358/216, 346, 348, 332; 360/3

[56] References Cited

U.S. PATENT DOCUMENTS 4,264,922 4/1981 Hoffman et al. ................... 358/54
4,329,715 5/1982 Attridge ............................. 358/214
4,331,979 5/1982 Bendell ............................. 358/209

FOREIGN PATENT DOCUMENTS 0013610 3/1982 European Pat. Off. .
2632378 1/1978 Fed. Rep. of Germany .
1505533 3/1978 United Kingdom .
2007935 5/1979 United Kingdom .
2061057 5/1981 United Kingdom ............... 358/214
1597504 9/1981 United Kingdom .
1604546 12/1981 United Kingdom .
2097220 10/1982 United Kingdom .

OTHER PUBLICATIONS

"Novel Uses of Digital Processing in a Modern Telecine", I. Childs & M. J. Griffiths, International Broadcasting Convention, Brighton, U.K., Sep. 18-21, 1982, pp. 46-50.

"FDL 60-Progress in Film Scanning Using CCD Sensors and Digital Processing", D. Poetsch et al., 'International Broadcast Engineer', Jan. 1981, pp. 47-49.

Primary Examiner—Robert G. Lev
Attorney, Agent, or Firm—Robert F. O'Connell

[57] ABSTRACT

In a telecine apparatus having a film transport mechanism for moving a film at a nominally constant speed and including a motor driving a capstan around which the film passes, there is a sensor for line-by-line scanning of the film to provide a raster-scanned electrical output signal representative of the film image. Also included is a scan control and a film speed measuring device coupled to the capstan to provide an output representative of the instantaneous film speed. A compensating device connects the output of the film speed measuring device to an input of the scan control such that the scan time of a particular line scanned by the sensor is varied to compensate for fluctuations in the film speed.

51 Claims, 12 Drawing Figures

TELECINE MACHINES

BACKGROUND OF THE INVENTION

This application concerns various improvements in the field of telecine machines, and relates to various inventions concerned with improved operation of the machines. A telecine machine, often simply termed 'a telecine', is operative to generate a television signal or at least a video signal from cinematographic film.

There are now available two principal types of telecine machines which are of interest, namely the linear array type and the flying spot type. A linear array telecine has a linear array of light-sensitive elements, namely in the form of a charge coupled device (CCD), which provides a serial output representing a line of television signal at a time. The film is driven at a constant rate between the linear array and a light source in a direction substantially perpendicular to a plane containing the sensor array, and an optical system images an illuminated section of film on the sensor array. Such a telecine machine is described in U.S. Pat. No. 4,275,422.

The flying spot telecine has been available for many years and comprises an imaging CRT tube on which a spot is illuminated to provide a scanning light source for the film. A single sensor device is located on the other side of the film and an optical system collects the light which passes through the film and images it onto the sensor device.

With linear-array telecines, it has been proposed to include a digital store at the output of the telecine to convert non-standard signals from the sensor array into standard format. It has also been proposed to use digital stores with flying-spot scanning telecines.

The following description will initially be made with reference to a linear-array telecine. However the application of the principles described is not so limited and they can also be used with flying spot telecine machines, as is discussed in more detail below in the detailed description of a preferred embodiment.

DESCRIPTION OF THE PRIOR ART

The way in which a line-array telecine operates is, by now, well known. Vertical scanning of the film image is accomplishd by the physical movement of the film. There are several consequences of this. The first is that the signals emerge from the sensor in a sequential order, so conversion to standard interlaced form is thus necessary and this implies the use of digital storage at the output of the telecine. A second consequence is that the height of the final television picture can only be adjusted (for a given film speed) by varying the scan rate of the line-array sensor, and that this scan rate will also vary between the different film gauges, because of the different size of the frame bars. Another consequence is that the nominal scan rate of the sensor should be related to the nominal film speed, in other words, if the film is replayed at 18 frames per second, the sensor scan rate will be 0.72 times that at 25 frames per second.

It is thus apparent that the sensor only rarely scans at the same rate as the television line standard and that a second function of the digital output store is to provide a buffer between the incoming scan rate from the sensor and the outgoing scan rate locked to station syncs. Low sensor scan rates can be accommodated relatively easily; one convenient approach is to use a fixed clock frequency and and insert "gaps" of variable numbers of clock pulses between successive scans. The maximum scan rate of which a sensor is capable is fixed, however, and so there is a maximum speed at which a film can be run if the sensor is to scan every line. For example, the sensor scan rate required by normal aspect ratio 35 mm film running at 25 frames per second and producing an output intended for the 625/50 standard is 18.075 kHz (i.e. 1 line every 55.3 microseconds). If a telecine were to be designed with this as a limit, then 16 mm film could be run at speeds up to 28.9 frames per second; any increase over these speeds, or any increase in the displayed picture height, would mean that the sensor could not scan every line. Thus an alternative must be used.

Earlier proposals, for example British Pat. Nos. 1,597,504 and 1,604,546, have considered these problems and produced solutions whereby the scanning rate of the line-array sensor and the speed at which the film is moved can be linked. Both of these earlier methods are subject to limitations, however. In the case of Patent No. 1,597,504 the film running speed and sensor scanning rate are each locked independently to the incoming television synchronising pulses. Although the parameters of this locking can be varied to take account of changes in nominal running speed, there is no method by which any fluctuations in film speed can be corrected for; thus, until the film transport servo system has settled down (which might take several seconds) there may be severe framing or geometric errors on the output television picture.

The system of Patent 1,604,546 is very similar in that, under locked-up running conditions, both sensor scanning rate and film motion speed are independently locked to an external reference. In addition, it allows for a second mode of operation whereby the sensor scans at a constant high speed and the film is allowed to move at any speed. Again, however, there is no accommodation of changes in the film running speed, and the arbitrary way in which the film is scanned leads to several problems. At low film running speeds the output television pictures show a random vertical frame distortion varying from line to line. At medium speeds a join appears in the television output above which the information comes from one film frame and below which it comes from an adjacent frame; this join may roll through the television picture. And finally, at high film speeds, the random way in which the output television signal is assembled produces a very disturbing result.

SUMMARY OF THE INVENTION

The inventor has appreciated that there are a number of improvements which can be made to the available telecine machines and these improvements are defined in the appended claims.

In a preferred embodiment of the invention the scan rate of the line-array sensor is linked directly to the film speed. Ways of measuring the film speed are already incorporated in a telecine as part of the film transport servo system. Using the output from these measuring devices also to drive the sensor scanning circuits has the result that once the film framing information has been acquired (which can be achieved when the film is first run after being laced onto the machine and takes only a few film frames—a fraction of a second—to complete) any fluctuations in the film motion can be tracked by the sensor scanning system. Thus any disturbance caused by starting, stopping and changing speed can be minimised; ideally the 'run-up' time required by the telecine can be reduced to zero, that is the telecine can be started only when its output is required by the television system and not several seconds in advance, as at present.

It will be appreciated that various different outputs may be required for different purposes. It may be simply that the film is being scanned for review purposes, e.g. for editing. In this case the displayed quality need not be particularly high, but scene and shot changes should be fairly clearly defined. Alternatively, it may be that a broadcast quality signal is needed, in which case a higher quality output without flicker or movement judder becomes important.

BRIEF DESCRIPTION OF THE DRAWINGS

The invention will now be described in more detail, by way of example, with reference to the drawings, in which.

DESCRIPTION OF PREFERRED EMBODIMENTS OF THE INVENTION

The following description is broken down into different sections covering the principal important features of the preferred telecine machine embodying the invention.

1. BASIC VARIABLE-SPEED/HEIGHT CONTROL SYSTEM

Figure 1:
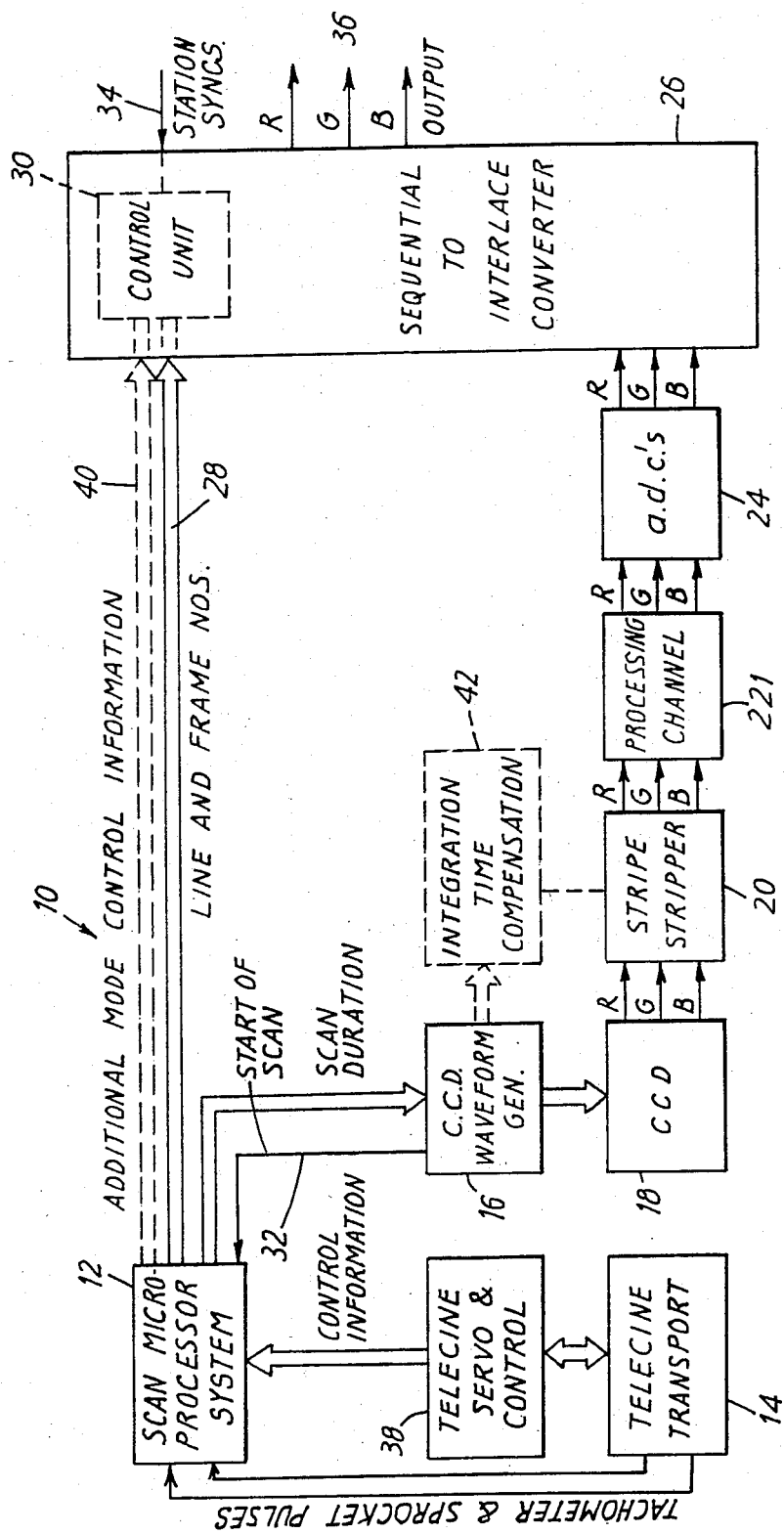
FIG. 1 is a block circuit diagram of a linear-array telecine machine embodying the invention in various of its aspects.

A control system for a variable-speed telecine embodying the invention based on a line-array sensor is shown in FIG. 1. The system includes a microprocessor 12 which links the servo circuits 38 of the telecine transport 14 to the scan-generating circuit 16 for the CCD sensors 18.

Figure 7:
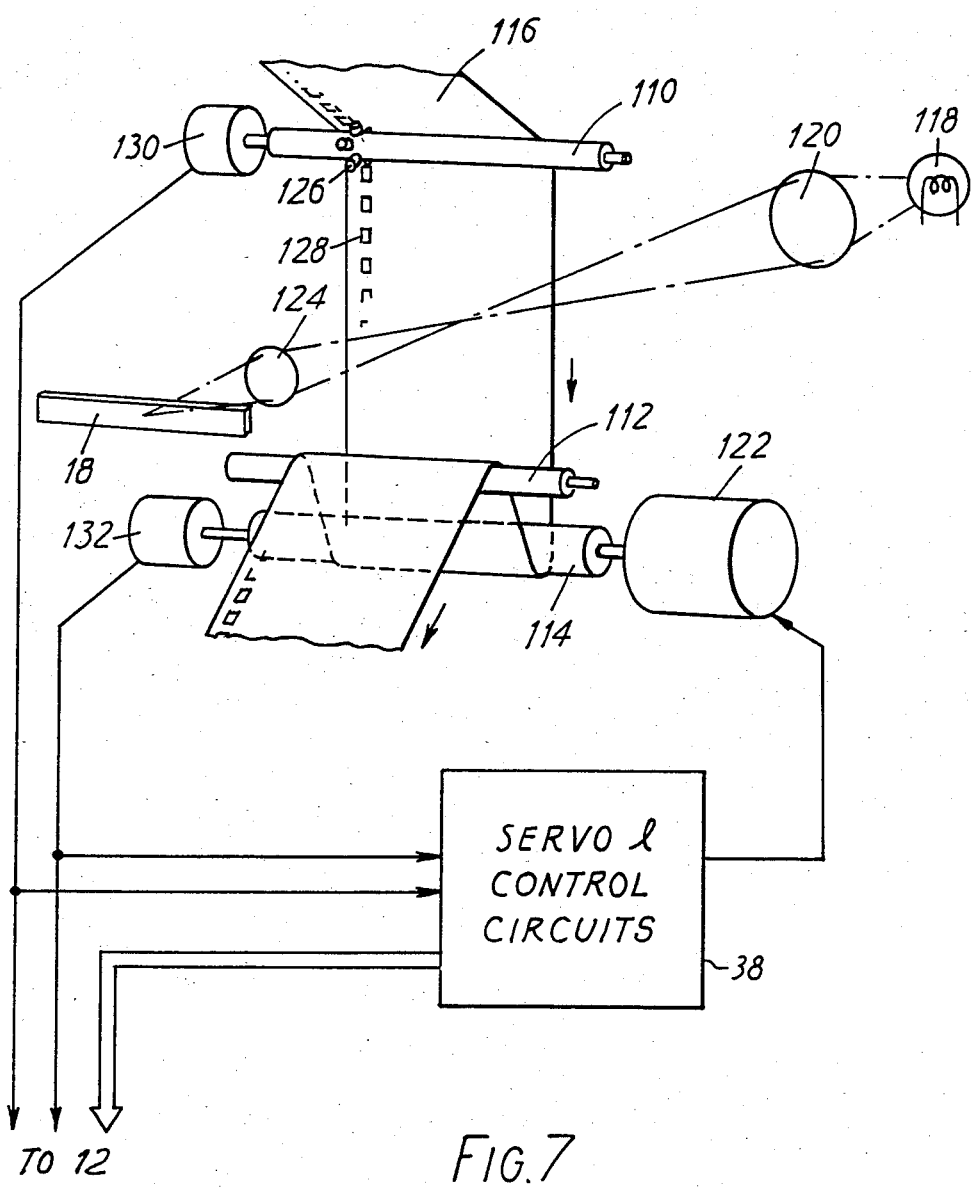
FIG. 7 is a perspective view of part of a telecine machine of the type having a linear array light sensor.

FIG. 7 shows the structure of a line array telecine. The film 116 is moved through the apparatus at a nominally-constant rate by a capstan 114 driven by an electric motor 122 and is guided by guide rolls 110, 112. To one side of the film is positioned a light source 118 and a collector or condensor lens 120. Opposed to the light source on the other side of the film 116 is the linear light sensor array 18, aligned parallel to the width of the film, and onto which light which has passed through the film is imaged by a lens 124. The sensor 18 has a plurality of sensor elements, e.g. 1024. As the film passes through the light path successive lines in the film picture are imaged on the sensor, which is scanned to produce a corresponding television signal.

The upper guide roller 110 carries sprocket teeth 126 which engage the film perforations 128. The roller 110 is thus positively driven by the film. A shaft encoder 130 fitted to the end of the sprocket roller 110 is arranged to emit a sprocket pulse every time a film frame passes.

The capstan 114 carries a capstan tachometer 132. The tachometer includes an optical tachometer disc fitted to the shaft of the capstan to enable the telecine servo units to accurately control the film speed. The tachometer produces a series of pulses the frequency of which is directly proportional to the film speed; some tachometers produce two sets of pulses, the relative phasing between which can be used to determine in which direction (forwards or backwards) the film is being driven.

The telecine servo and control circuit 38 includes the usual servo control loop for controlling the drive motor 122. The circuit 38 provides an electrical output for the scan processor indicating the film gauge set on the telecine control panel. It is also convenient to mount other manually-operable selectors on the control panel for controlling the display parameters, e.g. to initiate the wipe function described in Section 5 below. The outputs of such selectors are also applied to the scan processor 12.

Returning to FIG. 1, the microprocessor 12 is fed with the signals from the capstan tachometer and, from those signals, independently measures the speed and direction of the film motion. The speed is measured by counting the number of cycles of the microprocessor clock frequency (which is usually crystal-controlled and of high accuracy) which occur between successive tachometer pulses; this counting may be accomplished either as part of the microprocessor contol program or by use of a separate counting circuit (the latter approach is preferred as it gives a greater accuracy). If the physical dimensions of the film (which may vary slightly due to film shrinkage and/or manufacturing tolerances) are known accurately, then the scan rate required to produce television pictures of the desired height from the particular film gauge used can be easily calculated.

For example, if the number of microprocessor clock pulses occurring between successive tachometer pulses is n, if there are N tachometer pulses produced per revolution of the capstan, and if the microprocessor clock frequency is $f_m$ Hz, the capstan is rotating at a rate of $f_m/Nn$ revolutions per second. If the diameter of the capstan is $d_c$ meters then the film is moving at a linear speed of $\pi d_c f_m/Nn$ meters/second.

If the distance between successive frames on the film is $l_f$ meters then the rate at which the film is being replayed is $\pi d_c f_m/Nnl_f$ frames/second. Finally if the height of the film frame that it is intended should fill the 575 active lines of the 625/50 television picture is $l_a$, the scan frequency $f_1$ required from the line-array sensor is $f_1$ given by:

$$f_1 = 575(l_f/l_a \cdot (\pi d_c f_m)/(Nl_f) \cdot (1/n) \text{ scans/second} \quad (1)$$

A similar equation can be derived for the 525/60 television standard, in which the factor 575 is replaced by e.g. 485.

The first factor, $575 l_f/l_a$, depends only on the desired height of the final television image and is a user control. The second factor, $\pi d_c f_m / N l_f$, is largely constant for any given machine and film gauge; small variations will occur, however, due to variations in the film frame pitch, $l_f$. Such variations also affect the main telecine servo system and are measured, in conventional telecines, by incorporating an idling sprocket wheel driven by the film perforations; this sprocket emits an electrical pulse once per film frame and examination of this pulse by the telecine servo system enables the film speed to be adjusted to compensate for these variations.

As with the capstan tachometer output, the output of this idling sprocket is fed to the microprocessor 12. The microprocessor can then calculate the correct value of $l_f$; the way in which this can be done will be described below.

When the microprocessor 12 has calculated the desired scan rate, information is sent to the waveform generator 16 which produces the signals required to drive the sensors 18. In order to produce the signals the waveform generator requires a stable clock frequency at a frequency determined by the parameters of the line-array sensor; such a clock frequency is provided by including a further crystal oscillator (termed the sensor clock oscillator) as part of the waveform generator. A convenient way of establishing a given sensor scanning frequency is therefore to count the number of cycles of this sensor clock oscillator; the information from the microprocessor 12 thus consists of the desired number of sensor clock cycles, $c_s$, in a scan. If the sensor clock frequency is $f_s$ Hz then the number of sensor clock cycles required per scan at a scan frequency $f_1$ is $f_s/f_1$ or:

$$c_s = (l_a/575 l_f) \cdot (N f_s l_f)/(\pi d_c f_m) \cdot n \qquad (2)$$

clock cycles per scan.

The outputs from the sensors (one for each of the red, green and blue channels) are corrected for variations in element-to-element sensitivity in a circuit 20, processed in the normal manner through a processing channel 22, converted into digital form in analogue-to-digital converters 24, and then written into a sequential-to-interlace store 26. An alternative approach, not shown, is to matrix the RGB signals out of the processing channel into YUV form before feeding to the analogue-to-digital converters. This allows some saving in the storage requirement to be achieved as the U and V signals can be reduced in bandwidth compared to the Y signal.

The scan microprocessor 12 must send a line and frame number 28 to the control unit 30 for the sequential-to-interlace converter (itself another microprocessor) to identify the particular line being scanned. The sequential-to-interlace converter control unit 30 uses this information to decide where in the store 26 the particular scan signals should be put so that they may be retrieved correctly. It is also responsible for retrieving the scan information in response to station synchronising signals at an input 34 to provide R,G and B signals at the output 36.

In order for the scan microprocessor 12 to calculate the line and frame number 38 it is necessary to provide an additional signal 32 from the waveform generator 16 indicating the start of every scan. On receipt of such a 'start of scan' signal the scan microprocessor calculates the next line to be scanned by incrementing or decrementing the previous line number by one, depending on whether the film is running forwards or backwards, and incrementing or decrementing the frame number if the resulting line number is either greater than $575 l_f/l_a$ (forwards running) or less than 0 (backwards running).

Thus the scan microprocessor 12 must carry out three separate operations in response to three separate inputs. In response to a start of scan pulse 32 it must update the line and frame numbers 28 fed to the sequential-to-interlace control unit 30. In response to a pulse from the capstan tachometer 132 it must calculate the scan duration information fed to the waveform generator 16. And in response to a pulse from the idling sprocket shaft encoder 130 it calculates the film shrinkage information used in the other calculations.

This shrinkage information, $l_f$, is calculated by assuming an initial value. The line and frame numbers being sent to the sequential-to-interlace control unit at the time that a pulse is received from the idling sprocket, $L_n$ and $F_n$, are noted and compared with the corresponding values from the previous sprocket pulse, $L_{n-1}$ and $F_{n-1}$. Ideally $L_n$ should be the same as $L_{n-1}$, and $F_n$ should be either greater by one or less by one than $F_{n-1}$ (depending whether the film is running forwards or backwards). A line difference, $L_n - L_{n-1}$ (corrected for any additional difference between $F_n$ and $F_{n-1}$) is generated. If this is not zero then clearly the original value chosen for $l_f$ was in error and a new value $l_f^1$ is calculated by the formula:

$$l_f^1 = [1 \pm A(L_n - L_{n-1})] \cdot l_f \qquad (3)$$

where A is a constant whose value is chosen to achieve a satisfactory compromise between an excessively long response time (A too small) and an unstable response or one excessively sensitive to short-term fluctuations in the sprocket pulse rate (A too large). The plus or minus sign depends on whether the film is running forwards or backwards. A correction can also be made for any incorrect framing of the film by incorporating an additional term into the equation:

$$l_f^1 = [1 \pm A(L_n - L_{n-1}) \pm B(L_n - F)] \cdot l_f \qquad (4)$$

where F is a number indicating the desired framing relationship of the film—the line number that should be being scanned at the time a sprocket pulse is received—and B is a second constant whose value is subject to similar considerations to A.

A simplification can be made in order to reduce the computational burden on the scan microprocessor 12. Because the factor $l_a/l_f$ only changes when the displayed height changes and because the factor $N f_s / \pi d_c f_m$ is a constant for any given machine the shrinkage information $l_f$ need not be calculated independently. Instead an initial value for the complete expression:

$$K = (l_a/575 l_f) \cdot (N f_s l_f)/(\pi d_c f_m)$$

is assumed and this value used to replace $l_f$ in equation 3 and 4. If the displayed height is changed while the film is running, then corrections must be made to this value K to account for the changing value of $l_a/l_f$. It is convenient to make these corrections once per film frame during the interval between film frames so that errors in picture geometry are not produced in the television output.

In this way all the critical elements of the control system are digital and there is a rigid relationship between the film speed and the scan rate throughout the machine. Thus, once the correct framing relationship and film shrinkage information has been acquired it will be maintained whatever the film speed fluctuations. Broadcast quality signals may thus be generated, in perfect framing, at all speeds from still frame up to the maximum rate at which the sensors are capable of operating.

An emergency routine can be included in the scan microprocessor program to cope with situations where there is a loss of film framing. Such situations could occur when the film is first laced onto the telecine or following an extremely poor splice, for example. A suitable emergency routine would, on receiving a pulse from the idling sprocket wheel, immediately reframe the television picture; this would cause a large disturbance in the television output but it would only last for one film frame.

Figure 2:
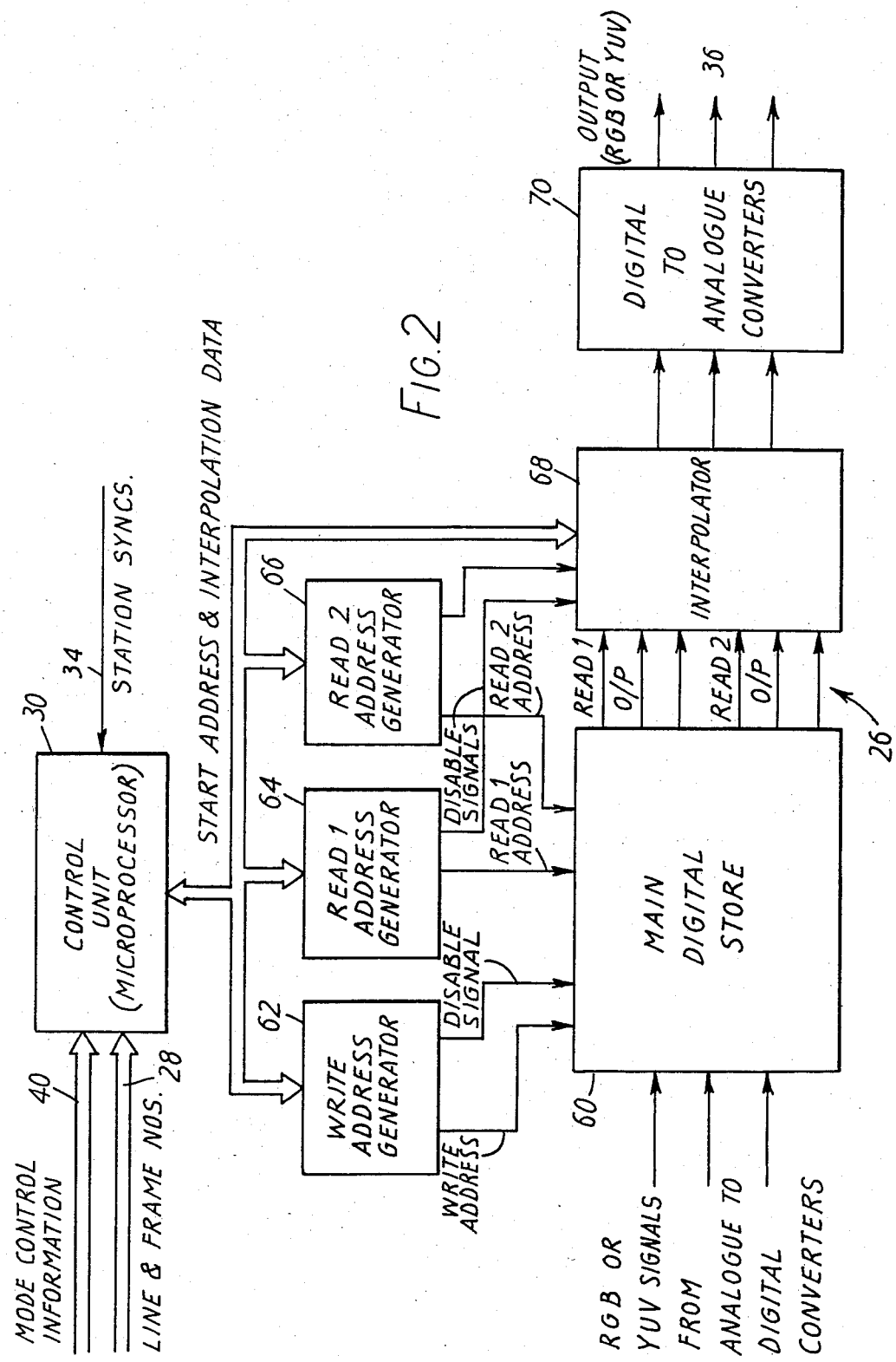
FIG. 2 is a more detailed block diagram of the sequential-to-interlace store unit 26 of the telecine of FIG. 1.

FIG. 2 shows a more detailed block diagram of the sequential-to-interlace store unit 26, together with its associated control microprocessor 30. A main digital store 60 is fed with a sequence of read and write addresses and incoming data, the latter being the main signal from analogue-to-digital converters 24. The size of store required is discussed in U.S. Pat. No. 4,275,422. The incoming data is written into the storage location specified by the write address from write address generator 62. Data is read from the location specified by the read addresses from the read address generator(s) of which there may be more than one; two separate read address generators 64 and 66 are shown in FIG. 2. The address generators 62, 64 and 66 are fed from the control microprocessor 30. The control microprocessor specifies a start address and the address generators increment this value element-by-element for the duration of one television line. After this time they stop; the control microprocessor 30 must then send another start address to enable the reading or writing process to continue. Thus the storage is organised in blocks of one television line; if a start address is not received, or if the microprocessor 30 generates an invalid line address, the address generator produces a 'disable' signal. This 'disable' signal eight prevents the writing process (write address generator 62) or blanks the relevant data output (read address generator 64 or 66). This blanking facility can be useful—one application is described in section 4 below.

The two outputs from the digital store 60 feed an interpolator unit 68. This interpolator combines the two data feeds read under the control of read address generators 64 and 66 in a proportion determined by the control microprocessor 30. It can be used to provide movement interpolation, as in U.S. Pat. No. 4,275,422, or to provide interpolation between picture lines, as will be described in section 3 below. The outputs can be subject to digital-to-analogue conversion in converters 70.

In operation, the sequential-to-interlace control microprocessor 30 is fed with the line and frame number of the incoming scan received over line 28. It allocates a storage block to that incoming information and retains the location of that block (or information enabling it to recalculate the block location) in an internal memory. An interface is provided between the microprocessor 30 and the incoming television synchronising pulses on line 34; this interface generates the line number required for the next television output line. The control microprocessor 30 then recovers the store block location of the information that was stored having the same line number, the appropriate frame number of the information being calculated in the manner described in U.S. Pat. No. 4,275,422, and calculates the appropriate interpolation parameters required.

Figure 3:
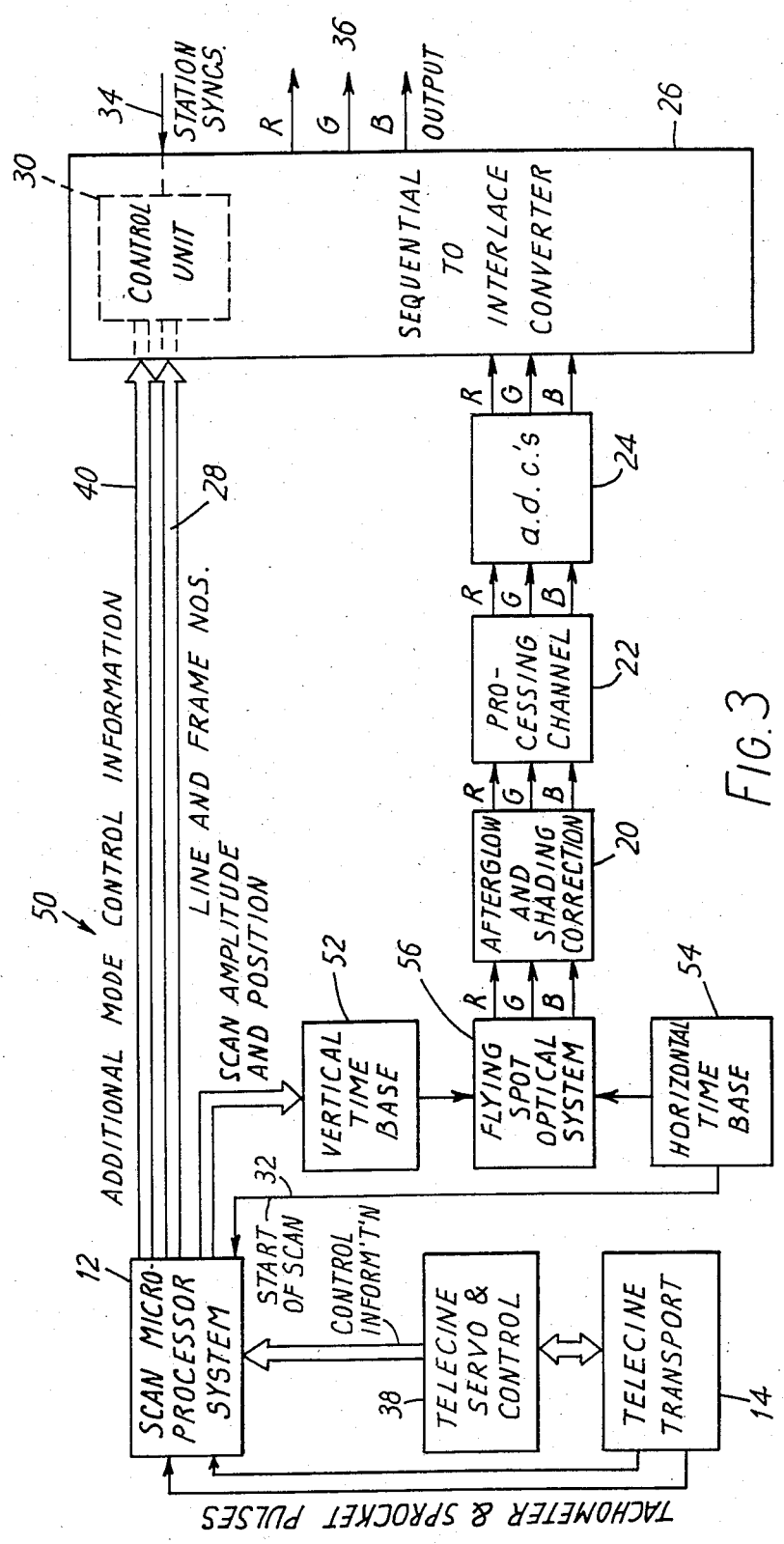
FIG. 3 is a block circuit diagram similar to FIG. 1 for a flying-spot telecine.

FIG. 3 shows a modification of the system of FIG. 1 suitable for use with a flying-spot telecine, the system of FIG. 2 remaining unaltered. Flying-spot scanners differ in many respects from line-array scanners; of these only two are relevant here. The first is that variation of the horizontal scanning rate is more difficult for a flying-spot machine; in contrast, the ability to alter the vertical position of the scanning spot makes the vertical scanning requirements easier. Nevertheless it is clear that there is a considerable similarity with the system of FIG. 1, and the same reference numerals are used where appropriate. In contrast to the line-array control system, it is the delay time between successive vertical scan intervals from the vertical timebase 52 that is varied to enable the film speed to be tracked, rather than the delay between horizontal scan intervals provided by the horizontal timebase 54. This delay slightly alters the vertical positioning of the scanned lines. The vertical amplitude of the scanning raster as provided by the vertical timebase circuit 52 must also be adjusted but this allows control of the height of the television image without altering the other scanning parameters; because of this the televising of non-anamorphic wide-screen films does not lead to the problems encountered in line-array systems.

With the exception of the compensation for variable integration time (described below), which is unnecessary for flying-spot telecines, most other features of the two systems are identical. The correction circuitry 20 is that appropriate to a flying-spot telecine. It is still necessary to repeat fields electronically when the film moves slower than 25 frames per second, although when the film is moving very slowly it is now possible to generate each pair of displayed fields from a separate flying-spot scan, making colour correction of slow-moving or stationary film slightly easier. Likewise, it is still necessary to interpolate between lines when the film is moving quickly (as will be described in section 3 below) because the scan rate of a flying-spot tube is subject to similar restrictions to that of line-array sensors. Finally, the output signal will benefit to the same extent from the movement interpolation described in U.S. Pat. No. 4,275,422 when the film is running at non-locked speeds.

Thus it will be seen that a method of controlling the scan formation of either a line-array or a flying-spot telecine is provided, capable of providing significant improvements in the variable-speed running characteristics of such machines. In particular, broadcast quality television pictures may be produced at up to more than 50 frames per second film speeds (using the methods described in section 4 below), and pictures adequate for review purposes may be produced at much higher rates than this—speeds of 400 frames per second and higher are possible.

2. COMPENSATION FOR INTEGRATION TIME VARIATIONS

This section is specific to line-array telecines and is not applicable to the flying-spot telecine system of FIG. 3.

With the control system described in section 1 above the sensor scan rate depends on the running speed of the film. While this causes no problems with flying-spot telecines, the varying scan rate causes the integration time of the line-array sensors in line-array telecines to vary. This in turn causes an apparent change in sensitivity of the sensors which, uncorrected, would cause fluctuations in the final television picture. Neither of the abovementioned British Pat. Nos. 1,597,504 and 1,604,546 mention the presence of this effect or any mechanism for overcoming it. In the case of Patent 1,604,546 this is probably because the telecine manufactured by the patentees used a light valve to control the light level falling on the line-array sensors; this light valve is required primarily to adjust the signal level to compensate for exposure variations on the film, but it would additionally allow variations in integration time to be compensated for by altering the brightness of the source illumination. Patent 1,597,504 likewise gives no indication as to how this problem might be overcome.

A light valve can cause problems because of its relatively slow response time and additional complexity. The control system of section 1 above is capable of producing very fast changes in the integration time of the line-array sensors (faster than those produced by the systems of the two patents just mentioned) and these changes might not be compensated sufficiently quickly by a light valve. For these reasons a more satisfactory solution is desirable, and in our preferred telecine the variable sensitivity produced by the changes in integration time is compensated by the use of a variable-gain amplifier which compensates the magnitude of the signal in inverse relation to the instantaneous period of the line scan. Such a variable-gain amplifier is already needed in order to compensate for variations in element-to-element sensitivity along the line array; it is now necessary to alter the range over which this amplifier operates.

Figure 4:
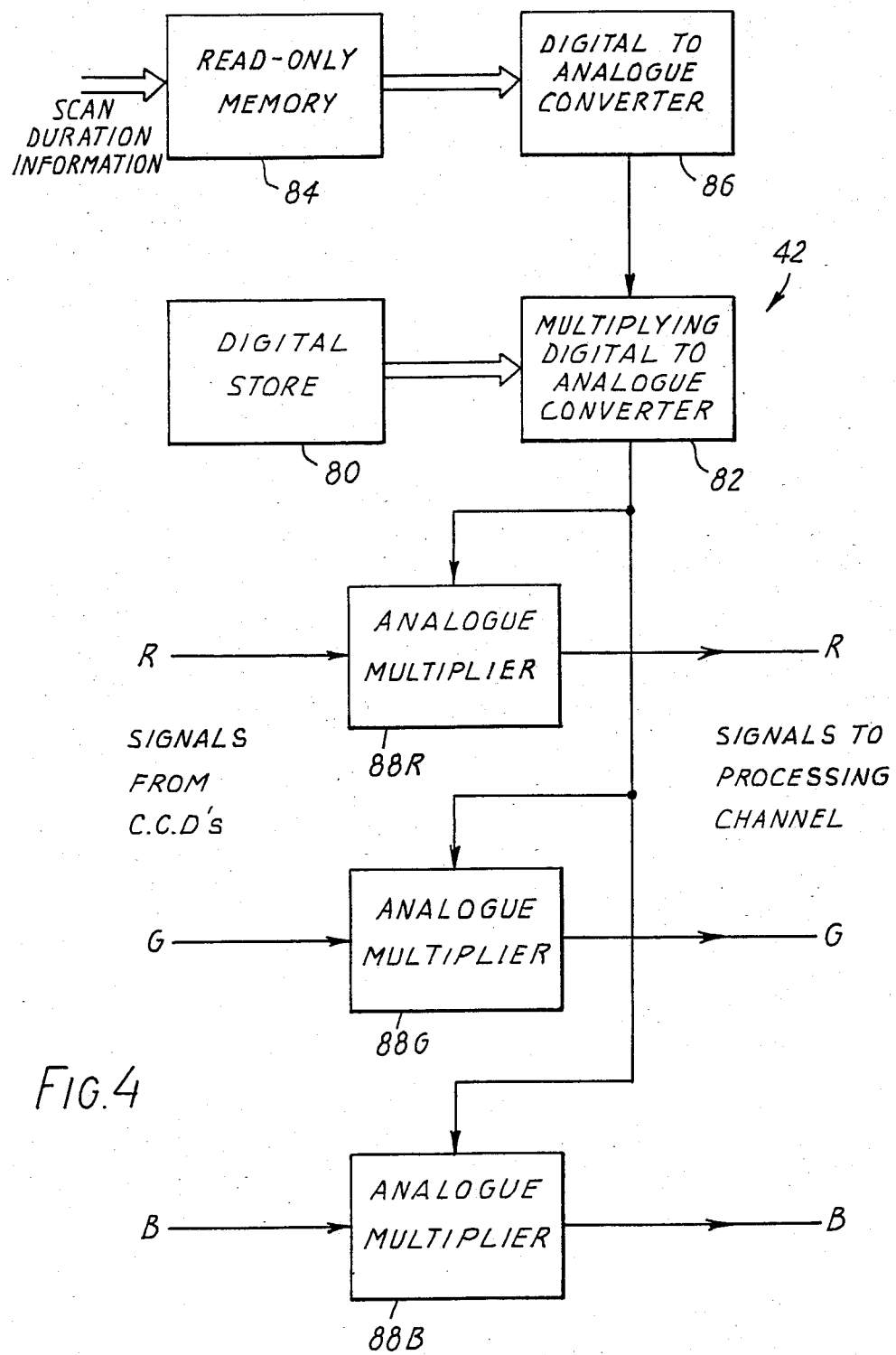
FIG. 4 is a block circuit diagram of a system for correcting variations in integration time and in element-to-element sensitivity of the CCD sensor.

FIG. 4 shows a block diagram of the circuit 42 for correcting variations in integration time and element-to-element sensitivity. A digital store 80 contains information on the gain required to compensate the output of the sensor for variations in element-to-element sensitivity (such compensation is described, for example, in British Pat. No. 1,526,801). The output from this store is fed to the digital input of a multiplying digital-to-analogue converter 82; the analogue input (described below) to this converter is the compensation for integration time variations. The digital-to-analogue converter 82 multiplies the two corrections together and feeds the combined correction signal to one input of three analogue multipliers 88 (one for each of the R, G and B channels) whose other input is the output of the linearray sensor. Each multiplier 88 acts as a variable-gain amplifier and thus corrects the sensor output for the effects of both element-to-element sensitivity variations and variations in integration time.

In order adequately to correct for the effect of variations in integration time, the compensation input to the multiplying digital-to-analogue converter 82 must vary according to the reciprocal of the sensor scanning period. There are two alternative ways of calculating this reciprocal. The first is to use the scan microprocessor 12 in the telecine control system to calculate the correction; this method involves no additional circuitry but places an extra burden on the speed required of the scan microprocessor. The second method is to use the scan duration information already calculated by the scan microprocessor 12 and fed to the CCD waveform generator to feed a separate shaping circuit which could use a digital read-only memory 84 to generate the desired reciprocal, as illustrated in FIG. 4. This digital version of the correction signal is converted into the analogue form required by the multiplying digital-to-analogue converter 82 in a second digital-to-analogue converter 86.

3. DISPLAY AT LOW FILM SPEEDS—USE OF DUMMY SCANS

Some problems remain. One of these is the need to compensate for a very wide range of integration times; another is that if the intervals between scans become very long, as they can for low film speeds, then there is a danger that the sensors may overload. Both of these problems can be eliminated if the range of integration times that need to be compensated for is kept as small as possible. This can be achieved by restricting the range of allowable integration times to a predetermined factor of for example 2:1. If the sensor scan rate falls below one half of the maximum value, two scans are generated and one is discarded; this 'dummy' scan is generated by a suitable program in the scan microprocessor 12 (FIG. 1) and identified as not being a valid scan either by using a separate signal from the scan microprocessor system to the waveform generator 16, or, more simply, by merely omitting the label sent to the sequential-to-interlace microprocessor on line 28. Thus identified they are then ignored by the sequential-to-interlace converter system.

More generally, when the required line scan rate is less than a predetermined fraction of the normal rate, the line scan rate is automatically increased by an appropriate predetermined factor m, and only one out of each m lines thus generated are used in the output signal.

As the film slows down even further, the scan rate of the line-array sensor again reduces until, eventually, more dummy scans can be generated. It is convenient to keep the valid scans of fixed duration (corresponding to the maximum sensor rate) and to vary only the number and duration of the dummy scans in order to track film speed variations. If this is done, any errors in the compensation process for integration time variations will be much less visible and will be limited to a slight change in intensity occurring at the critical film speed marking the boundary between scan rates just more than half the maximum value (no dummy scans being generated) and scan rates just less than half the maximum value (dummy scans being generated).

In practice if the film speed is hovering about the critical film speed there is a danger that slight changes in intensity due to errors in the compensation operation may be disturbing if the apparatus is continually changing between normal operation and the dummy scan mode. It is therefore desirable to introduce a degree of hysteresis into the system such that the critical film speed at which the system changes from normal to dummy scan mode is slightly lower than that at which it changes back from dummy to scan mode to normal operation.

British Pat. No. 1,604,546 also describes a method of discarding extra generated scans. This earlier proposal, however, suffers from several disadvantages. Because of the reliance on a relatively slow-acting light valve to control the output level of the sensors, no sudden changes in sensor scan rate can be accommodated. The sensor is thus operated at a fixed, high scan rate and the nearest scan to the desired position is chosen as the correct one. The consequence of this approach is that the final output television picture may display some geometric instability which, at some values of film speed, can be disturbing. The Patent does also mention a rather more controlled approach to discarding the dummy scans with respect to the generation of television pictures in the 'letterbox' format from Cinemascope films. Again, however, the small range of operating speed variation tolerated and the lack of any ability to vary the displayed height of the image represent severe limitations.

The way in which the dummy scans are generated in our preferred telecine will now be described. Suppose the $c_{min}$ is the minimum number of clock cycles required to complete a full scan at the highest scan rate and that $c_{max}$ is the maximum number of clock cycles required in a valid scan ($c_{max}$ being greater than or equal to $2c_{min}$). Firstly the microprocessor 12 checks that the calculated number of clock cycles per scan required to track the film speed, $c_s$, is greater that $c_{min}$; if not the film is moving too quickly and methods to be described in section 4 below must be used. If $c_s$ is greater than or equal to $c_{min}$ the microprocessor then checks if $c_s$ is greater than $c_{max}$; if $c_s$ is less than $c_{max}$ then a dummy scan is not required and a valid scan is carried out. However, if $c_s$ is greater than or equal to $c_{max}$ a dummy scan is required; the microprocessor calculates ($c_s - c_{min}$) and examines the result to see if it is also greater than $c_{max}$. If ($c_s - c_{min}$) is greater than or equal to $c_{max}$ then more than one dummy scan will be required; and dummy scan of duration $c_{min}$ is carried out at the end of which $c_s - c_{min}$ is re-examined to calculate further dummy and valid scans. If, however ($c_s - c_{min}$) is less than $c_{max}$ the following scan will be a valid one; since we wish to have all valid scans of duration $c_{min}$, the dummy scan must be of duration $c_s - c_{min}$. Following the dummy scan the microprocessor 12 initiates a valid scan of $c_{min}$ duration. The program in the sequential-to-interlace control microprocessor 30 remains unaltered from that of section 1 above.

While in principle dummy scans could be used in a flying-spot telecine, as there is in practice no serious problem in reducing the line scan rate in a flying-spot telecine to very low values, the use of dummy scans may not be of any real advantage. The principal interest therefore lies in relation to line array telecines.

4. OPERATION AT FAST FILM SPEEDS

In a telecine operating with a control system as described in section 1 above there is a basic difficulty when film is run at faster than normal speeds. This difficulty is caused by the fact that the sensor can no longer scan fast enough to track the speed at which the film is moving. Thus not every line can be scanned on every film frame.

This fact had been appreciated in British Pat. No. 1,604,546. However, the system described in that Patent has a major disadvantage in that the exact relationship between the number of lines scanned and the number of lines displayed is not subject to any detailed control but instead is allowed to vary from film frame to film frame as one set of control pulses changes in phase with respect to another. Consequently neither of the two possible display methods produce a pleasing picture. If the missing scan lines are replaced by adjacent lines in the same frame then the lack of any frame-to-frame correlation in which lines are repeated causes moving artefacts on the picture. If, instead, the missing scan lines are replaced by the corresponding lines of adjacent film frames then the resultant television picture "tears apart" in areas of movement, again in an uncontrolled manner.

The control system of section 1 above allows a substantial improvement to be made in the way that the limited number of scans available from the line-array sensor are displayed. This improvement is achieved by controlling the way in which the scan lines are repeated, by decreasing the line scan rate by a particular factor (m). For example, if the film is running at approximately eight times normal speed, the control system can ensure that lines 1, 9, 17, 25 etc of the television output always come from the most recent film frame, lines 2, 10, 18, 26 etc from the film frame before that, lines 3, 11, 19, 27 etc from the film frame before that and so on. This approach still results in moving objects splitting into multiple images, but the increased orderliness in the way in which this splitting is achieved is found to produce a much more acceptable result.

A further improvement can however be made by generating the missing scan lines from lines in the same film frame. In the example just given lines 1, 9, 17 etc. of every film frame would be scanned. At the start of a television field, the most recent film frame would be selected and line 1 read out four times (four rather than eight because each television field contains only half the total number of lines), line 9 read out four tmes, and so on. Alternatively, again, an interpolation between lines could be made so that the television presentation fades from line 1 to line 9 to line 17 and so on. This interpolation produces an additional loss of vertical resolution over and above that produced by the increased vertical movement of the film during the integration time of the sensor; it also means that events lasting for only a few film frames are harder to locate. Nevertheless, under most circumstances this approach produces by far the more acceptable results for review purposes.

The way in which the control system of FIG. 1 can achieve the desired operation will now be described. The scan microprocessor 12 calculates the number of sensor clock cycles, $c_s$, in a scan; this number is examined to see whether or not it is possible to achieve a full scan in the allowed time. If not the number is doubled and the new number examined again; the sequence of doubling and examination repeats until it is possible to achieve a complete scan in the required number of clock pulses. Thus the proportion that is scanned of the total number of lines is restricted to a binary sequence, i.e. either a half, or a quarter or an eighth etc., depending on the speed at which the film is running. In order to enable the sequential-to-interlace converter 26 to reconstruct the pictures correctly, information about this proportion must be sent to the sequential-to-interlace control microprocessor 30; this connection is shown by the dashed lines 40 in FIG. 1. Also transmitted along this connecton is information to instruct the sequential-to-interlace control microprocessor 30 as to which sort of display is required for the output television signal, i.e. lines repeated from earlier frames, lines repeated from the same frame, or lines interpolated from the same frame.

The number of times that $c_s$ is required to be doubled is also required for the calculation of line numbers. If $c_s$ was doubled three times, for example, that means that only every eighth line can be scanned. Thus on receipt of a start-of-scan pulse 32 the line number is incremented not by one, as in section 1, but by eight (or decremented if the film is running backwards). The line numbers then follow the desired sequence 1, 9, 17, 25 etc. The way in which the frame number is calculated must also be changed.

If the missing lines are to be generated by repetition or interpolation of lines from the same frame, then the scan microprocessor 12 resets the scanning sequence on every new frame so that the same line numbers are scanned on each film frame (an exception to this is outlined below). Thus, for example, if the film is being run forward at eight times normal speed so that lines 1, 9, 17, 25 etc. are scanned then, for 16 mm film presented at normal height, the final line to be scanned is line number 625. However, if line 625 was scanned, the first line that could be scanned on the following film frame would be line number 8; this would not allow the same sequence of lines to be scanned on all film frames. This difficulty is overcome by slightly lengthening the previous scan (line 617) so that line 625 is not in fact scanned but instead the scan takes place on line 1 of the next film frame. If the missing lines are to be generated by repetition of lines from earlier film frames then this scan lengthening procedure is altered slightly so that the line numbers scanned on each film frame are not all the same but change from frame to frame in a preset sequence (e.g. lines 1, 9, 17, 25 on one film frame; lines 2, 10, 18, 26 on the next and so on). A similar procedure is necessary if the film is accelerating. If every fourth line has previously been scanned and it now becomes necessary to scan only every eight lines, a similar jump may be necessary in order to return to the sequence 1, 9, 17, 25 etc.

The program in the sequential-to-interlace control microprocessor 30 is also modified from that described in section 1. As before, the incoming scans are stored in blocks of the sequential-to-interlace store and note is taken of where each line is stored. However, additional note is also taken of the proportion of lines scanned on each frame, transmitted along connection 40. When scans from a given film frame are read out the line number requested is examined to see if that particular line was originally scanned. If not, then either the appropriate line from an earlier film frame is used instead or else the nearest lines from the same film frame are repeated or interpolated, depending on which mode of display is required.

While, as noted above, this approach produces acceptable results for review purposes there are occasions when broadcast-quality output signals might be required. For example, it might be desirable to replay film at speeds of just higher than normal (up to 30 frames per second, for instance) or to increase the displayed height of film running at 25 frames per second (for example using 1.85:1 aspect ratio film). Under these conditions, where only every other line is available, it is clearly important to improve the quality as much as possible. The loss of vertical resolution, in this instance, is not very severe and may be recovered by suitable aperture correction after the sensor. This aperture correction may need different characteristics to more conventional correctors and will have only the drawback that high-frequency components of the sensor noise (not the film grain) will be increased. To some extent this increase in noise will be offset by the increase in signal gained by the integration of the light over two lines on the film. A more difficult problem is to make the alias components, produced by scanning only 312 lines, have as low a visibility as possible. This can be achieved by altering the approach described above slightly. The missing lines from any given film frame are sill interpolated from the lines scanned in that film frame. In addition, however, the alias components can be broken up by not always scanning the same lines; for example, on the first film frame lines 1, 3, 5, 7 etc are scanned and lines 2, 4, 6, 8 etc interpolated while on the second film frame the situation is reversed. By this method the aliasing can be made no more objectionable than that produced by the normal scanning process. Thus broadcast-quality pictures can be produced from film running at up to more than 50 frames per second.

5. DISPLAY MODE FOR USE IN REHEARSAL—VERTICAL WIPE

While the control system of section 1 above, with or without the refinements of sections 2, 3 and 4, is capable of providing an excellent television display for most normal purposes, there are circumstances where improvements are possible. One of these is under low speed 'inching' conditions when trying to locate the exact position of a shot change. At the present time two types of presentation exist in available telecine machines. One is that used in the Rank Cintel MkIII flying-spot telecine where the whole picture 'rolls' continuously upwards or downwards; this presentation makes location of a shot change easy but is unpleasant to view for any length of time. The second type of presentation, used in the system of British Pat. No. 1,604,546, is simply to slow down the rate at which the television picture appears to move; this type of presentation is also produced by the control system described in section 1 above. While the second type of presentation is more acceptable for prolonged viewing it can give the false impression that the film is running more slowly than it actually is and the accurate location of a shot change can be surprisingly difficult. Also, because only one film frame is displayed at a time, the degree of confidence that the shot change has in fact been located is usually small.

It is possible to modify the program in the sequential-to-interlace control microprocessor 30 (FIG. 1) to provide an alternative display for this case; the program in the scan microprocessor 12 is not affected.

Figure 5:
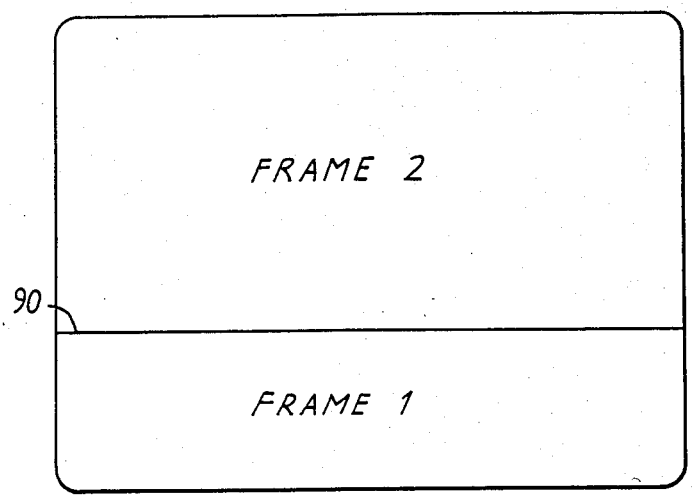
FIG. 5 illustrates a form of display which can be useful for review purposes.

To provide a display suitable for inching purposes note is taken of the current position of the scanned line on the film frame (the line number input on connection 28 to the sequential-to-interlace control microprocessor is used to provide the necessary data). All television lines above this position are taken from one film frame and all television lines below this position are taken from the adjacent film frame. The effect is to produce the presentation shown in FIG. 5 where the top part of the picture shows the top part of the most recent frame and the bottom part of the picture shows the bottom part of the preceding frame. The display 'wipes' vertically from one frame to the next; one or more lines at the join 90 between the two scenes can be blanked so as to form a black line which can be seen even under conditions when both frames contain the same scene. It has been found convenient to blank about four lines. With this display there is great confidence that a shot change has been accurately located—both scenes can be viewed simultaneously. At the same time the display is not tiring to view for long periods of time and the rolling black line gives a good impression of the speed of motion of the film.

In practice it is preferable to note the line being scanned at the beginning of each television field and to define the join by reference to that line.

The necessary steps to implement this operation are conducted under the control of the control microprocessor 30 as shown in more detail in FIGS. 11 and 12 referred to below.

6. DISPLAY MODE FOR STANDBY USE—SENSOR MONITORING

A second circumstance where the television display is inadequate is under 'standby' conditions, i.e. when the film is stationary or virtually stationary in the film transport mechanism. This is because the only television picture available for display is that contained in the sequential-to-interlace converter store 26. The operator can then not see if the sensors are still operating (or more importantly if the film illumination system is still functioning) and his confidence that the telecine is ready to run when necessary is reduced. Again, the program in the sequential-to-interlace control microprocessor 30 can be modified to provide a display overcoming this problem, without the scan microprocessor 12 being modified.

Figure 6:
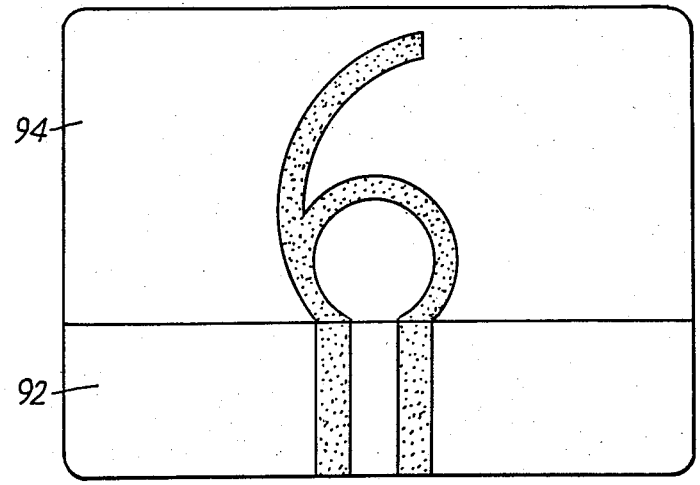
FIG. 6 illustrates a display in which a portion of the displayed picture consists of the input to the sequential-to-interlace converter for use on standby.

A display suitable for use under standby conditions is shown in FIG. 6. A portion, the lower portion 92 as shown, of the displayed picture consists of the input line to the sequential-to-interlace converter store 26, which is being continuously scanned by the CCD sensor 18, and is thus repeated to occupy the lower portion 92 of the display. Because the incoming scans are not synchronised to the television line rate, synchronisation is accomplished in the sequential-to-interlace store 26; this is achieved by taking note of the storage block into which the incoming scan is being placed. If it is a dummy scan and not a valid scan then a separate additional storage block must be allocated away from the area in which the rest of the film frame is stored—i.e. all scans are stored, not just valid scans; only one extra storage block of one line needs to be allocated, however, as it is not necessary to retain the dummy scans and they can therefore be allowed to overwrite each other.

On readout from the store, whenever the television line number is within a certain range, corresponding in this case to the lower part of the picture, the output is taken from the most recent input scan rather than the stored film frame. The program can be arranged to revert back to normal operation immediately the telecine is selected 'on air'.

The upper portion 94 of the display comes from the output of the sequential-to-interlace converter 26 and this shows that the store system is working.

7. MICROPROCESSOR OPERATION

Figure 8:
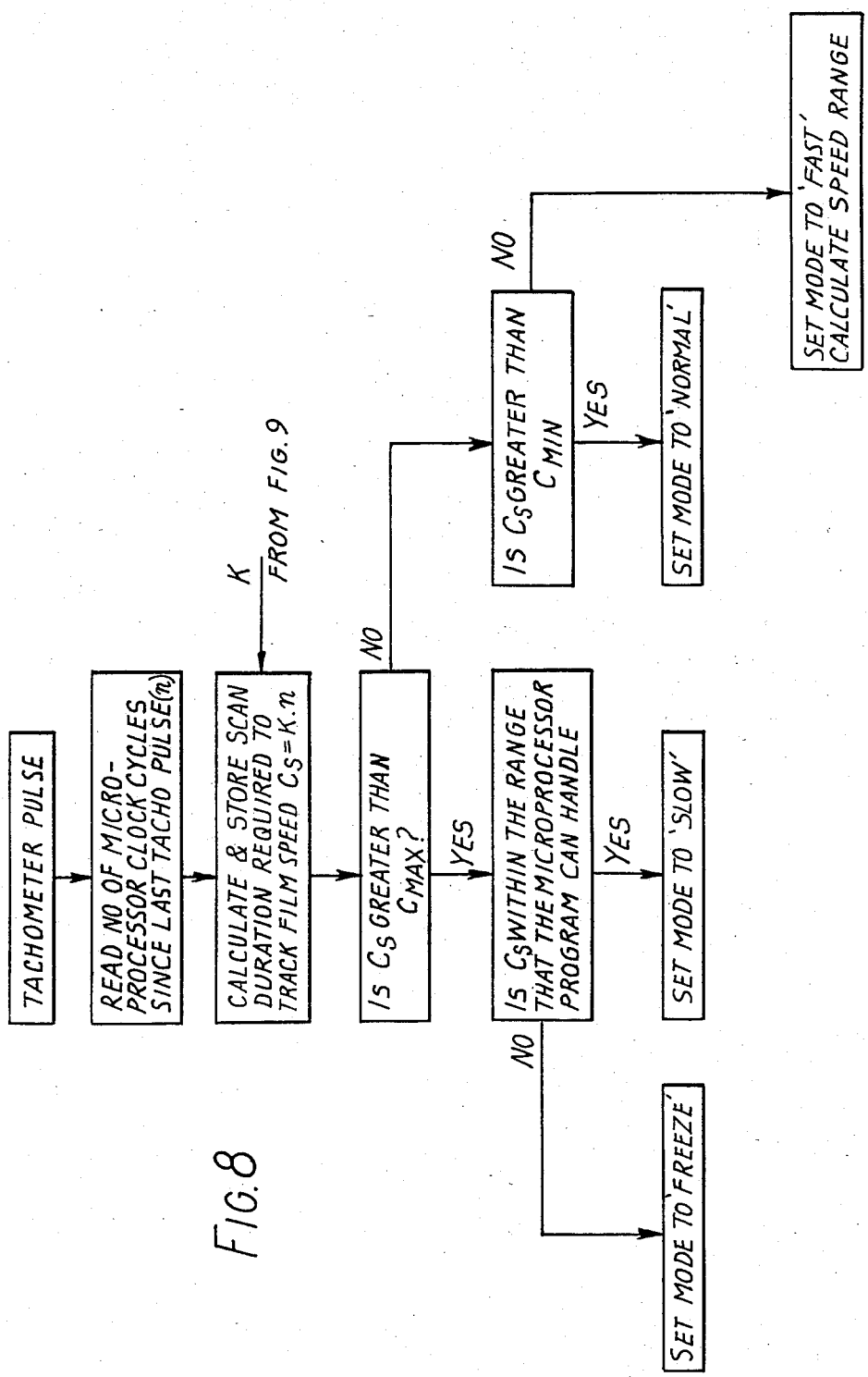
FIGS. 8, 9 and 10 are flow charts illustrating the operation of the scan microprocessor 12 in response to a tachometer pulse, a sprocket pulse, and a start of scan pulse respectively.
Figure 9:
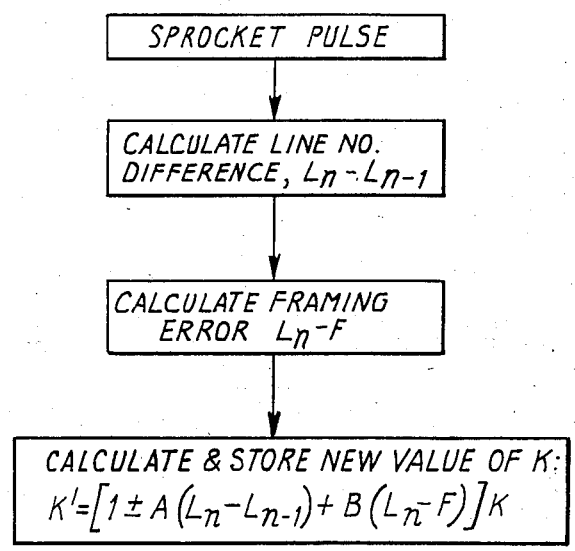
Figure 10:
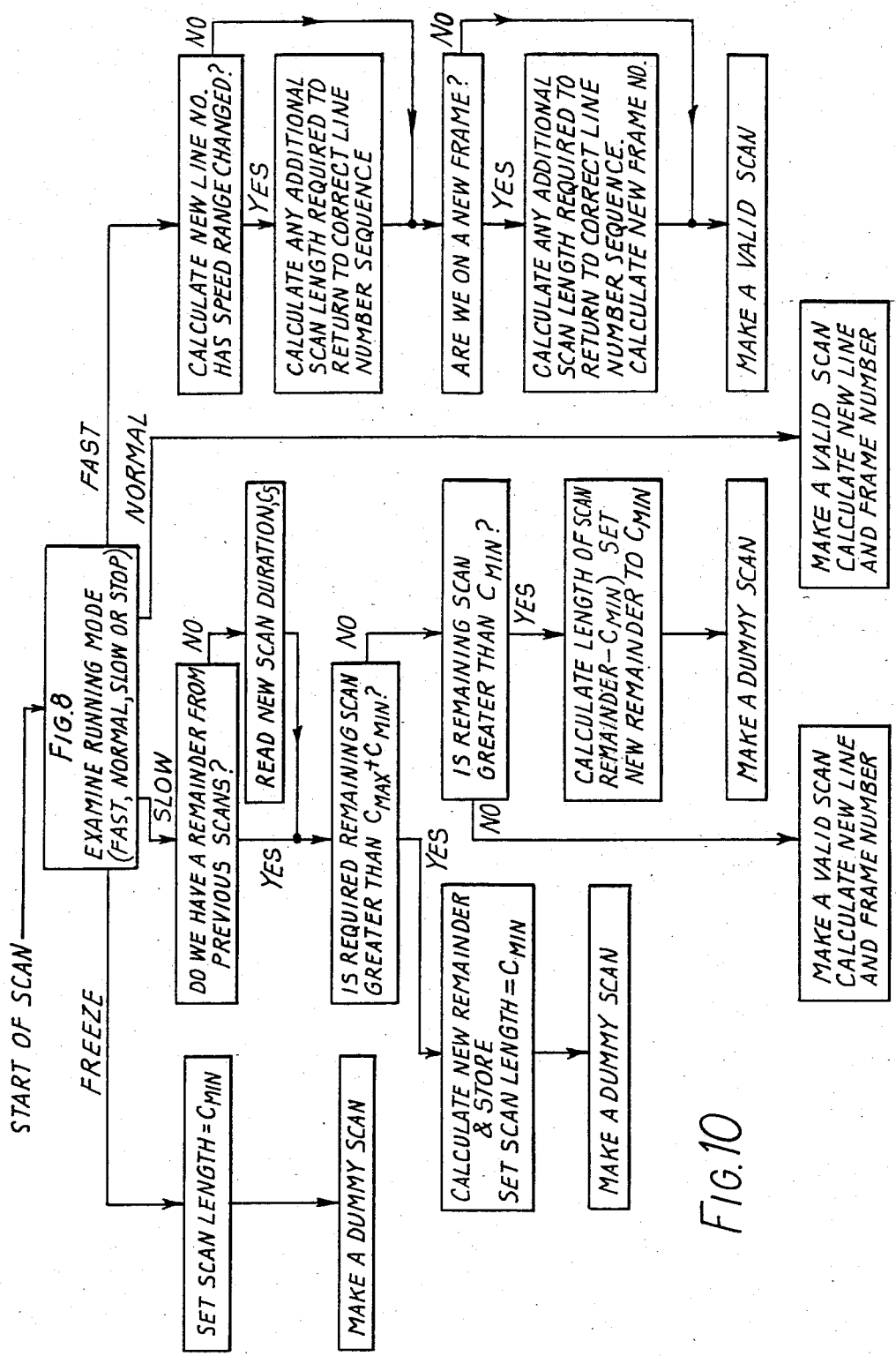

The operation of the scan microprocessor 12 and the control microprocessor 30 has been indicated in the preceding sections. The detailed operation of the scan microprocessor is further set out in FIGS. 8, 9 and 10 which are flow charts showing the required response of the scan microprocessor 12 to three input stimuli, namely:

FIG. 8—its response to a tachometer pulse from the tachometer 132,

FIG. 9—its response to a sprocket pulse from the shaft encoder 130,

FIG. 10—its response to a 'start of scan' pulse 32.

Figure 11:
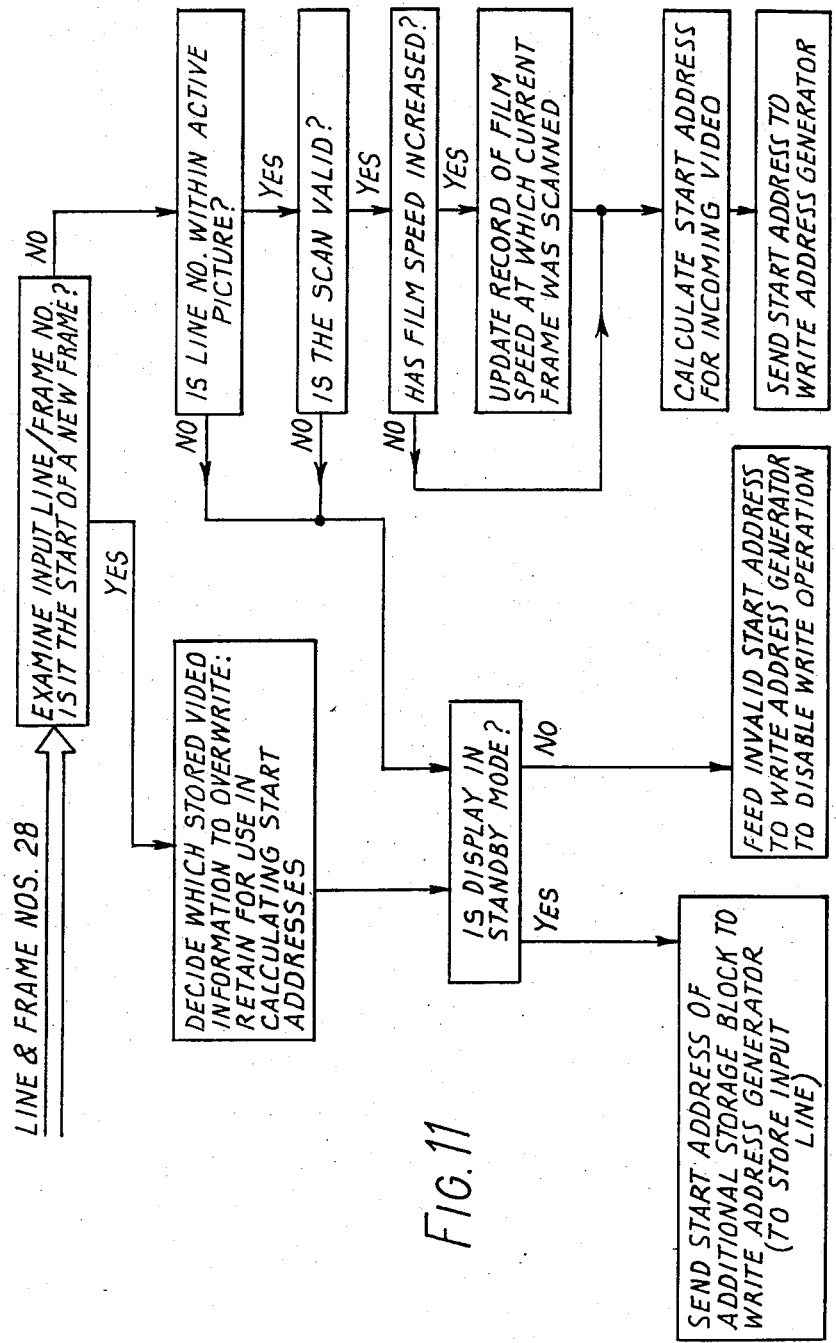
FIGS. 11 and 12 are flow charts illustrating the operation of the control microprocessor 30 in response to an input line and a request for an output line respectively.
Figure 12:
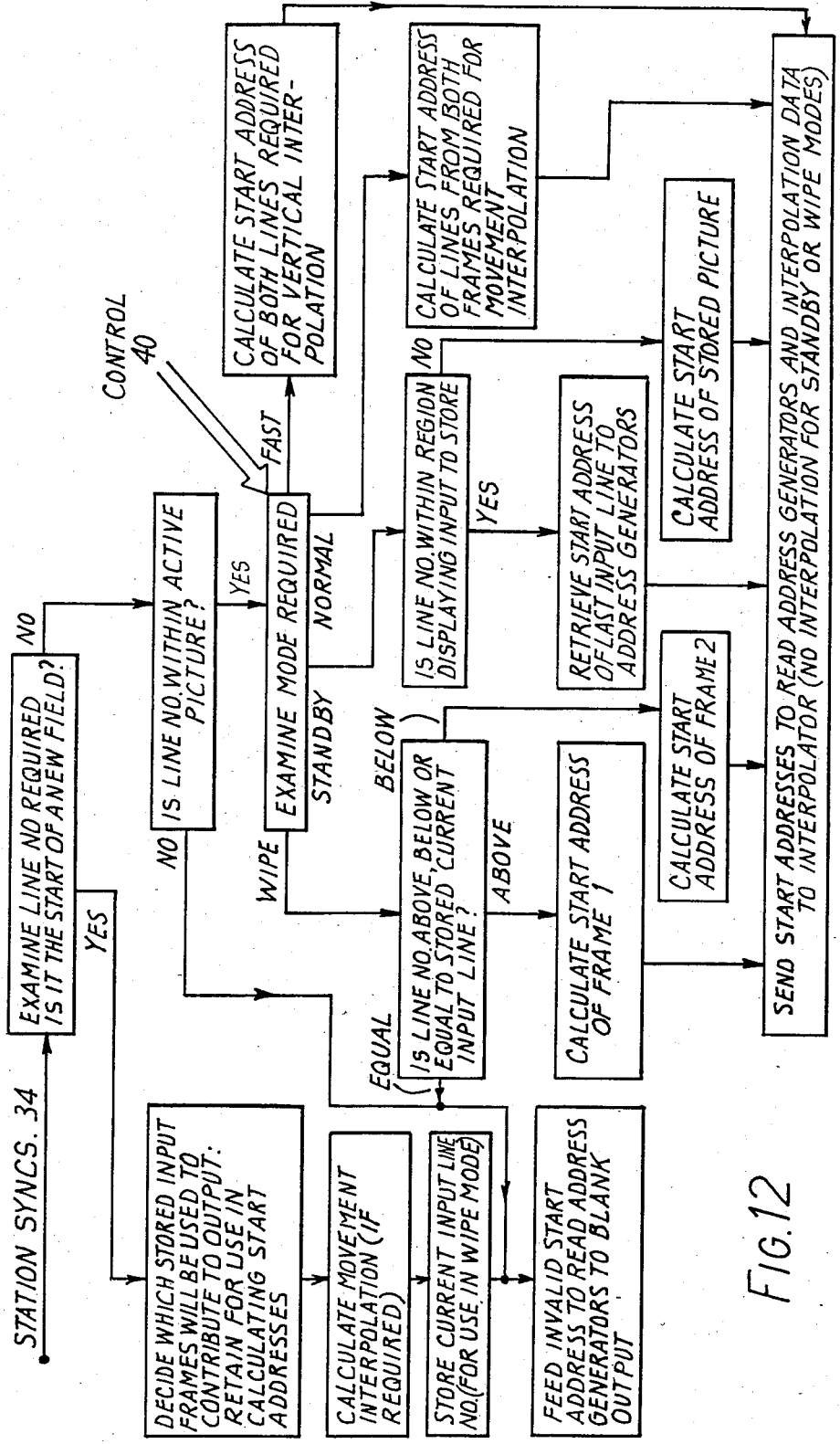

The detailed operation of the control microprocessor 30 in the sequential-to-interlaced converter 26 is further set out in FIGS. 10 and 11, which are similar flow charts showing the required response of the control microprocessor 30 to two inputs, namely:

FIG. 11—its response to an input line from the scan microprocessor,

FIG. 12—its response to a request for an output line from the station synchronising pulses.

The operational steps summarised in these FIGS. 8 to 12 will be clear from the wording on the figures taken with the pertinent parts of the foregoing description.

I claim:

1. Telecine apparatus comprising a film transport mechanism for moving a film at a nominally constant speed and including a motor driving a capstan around which the film passes, scan means for line-by-line scanning of a film to provide a raster-scanned electrical output signal representative of a film image, scan control means having an output connected to the scan means to control the scan, and a film speed measuring device coupled to the capstan provide an outside representative of the instantaneous film speed, characterised by compensating means connecting the output of the film speed measuring device to an input of the scan control means such that the timing of the line scanned by the scan means is varied to compensate for fluctuations in the film speed.

2. Apparatus according to claim 1, in which the scan means comprises a linear light sensor array and provides the lines at a rate such as to define an instantaneous period between the start of successive lines, and the scan control means includes means for automatically varying the periodicity of operation of the scan means in response to an electrical signal, and the apparatus includes second compensating means for compensating the magnitude of the said output signal in inverse relation to the instantaneous periodicity of the scan means.

3. Apparatus according to claim 1, in which the scan control means includes means for detecting when the line scan rate required is less than a predetermined fraction of a nominal scan rate corresponding to normal viewing of the film, and in response thereto causes the scan means to increase the line scan rate by a factor m, and the apparatus includes signal processing circuitry connected to the output of the scan means to select only one out of each m generated lines for subsequent processing.

4. Apparatus according to claim 1, in which the scan control means includes means for detecting when the line scan rate required exceeds a predetermined maximum rate, and in response thereto causes the scan means to decrease the scan rate by a factor m dependent upon the required line scan rate required.

5. Telecine apparatus comprising a linear light sensor array, a light source, a film transport mechanism for moving film at a substantially constant rate between the light source and the sensor array, an optical system for imaging an illuminated section of film on the sensor array, and scan means for causing the light sensor array periodically to provide an output signal representative of the imaged film section, characterised by scan control means for automatically varying the period of the operation of the scan means in response to an electrical signal, and compensating means for compensating the magnitude of the said output signal in inverse relation to the instanteous periodicity of the scan means.

6. Apparatus according to claim 5, in which the compensating means additionally compensates for variations in element-to-element sensitivity in the sensor array.

7. Apparatus according to claim 5, in which the scan control means includes means for detecting when the line scan rate required is less than a predetermined fraction of a nominal scan rate corresponding to normal viewing of the film, and in response thereto causes the scan means to increase the line scan rate by a factor m, and the apparatus includes signal processing circuitry connected to the output of the scan means to select only one out of each m generated lines for subsequent processing.

8. Telecine apparatus comprising a film transport mechanism, scan means for line-by-line scanning of the film to provide a raster-scanned electrical signal representative of the film image, scan control means having an output connected to the scan means to control the periodicity of the scan whereby a line scan rate can be materially varied from a nominal rate corresponding to normal viewing of the film, and signal processing circuitry connected to the output of the scan means, characterised in that the scan control means includes means for detecting when the line scan rate required is less than a predetermined fraction of the said nominal rate, and in response thereto causes the scan means to increase the line scan rate by a factor m, and in that the signal processing circuitry selects only one out of each m generated lines for subsequent processing.

9. Apparatus according to claim 8, in which each line selected by the signal processing means is arranged to be of substantially constant duration independent of changes in the said required line scan rate.

10. Apparatus according to claim 8, in which the factor m is a power of two.

11. Apparatus according to claim 8, in which the scan control means includes means for detecting when the required line scan rate exceeds a predetermined maximum rate, and in response thereto causes the scan means to decrease the scan rate by a factor m dependent upon the required line scan rate.

12. Telecine apparatus comprising a film transport mechanism, scan means for line-by-line scanning of a film to provide a raster-scanned electrical output signal representative of a film image, scan control means having an output connected to the scan means to control the periodicity of the scan whereby the line scan rate can be materially varied from a nominal rate corresponding to normal viewing of the film, and signal processing circuitry connected to the output of the scan means, characterised in that the scan control means includes means for detecting when the line scan rate required exceeds a predetermined maximum rate, and in response thereto causes the scan means to decrease the scan rate by a factor m dependent upon the required line scan rate.

13. Apparatus according to claim 12, in which the lines of each field of the output signal are derived from m/2 different film frames in a cyclical sequence.

14. Apparatus according to claim 12, in which the lines of each field of the output signal are derived from one film frame only and the signal processing circuitry is operative to generate m lines from each scanned line.

15. Apparatus according to claim 14, in which the output lines are derived by repeating lines from the said film frame.

16. Apparatus according to claim 14, in which the output lines are derived by interpolating from lines of the said film frame.

17. Apparatus according to claim 12, in which m is a power of two.

18. Telecine apparatus comprising a film transport mechanism, scan means for line-by-line scanning of a film to provide a raster-scanned electrical output signal representative of a film image, and signal processing circuitry connected to the output signal of the scan means and comprising a digital store capable of storing at least one field, characterized in that at least when the film is not moving above a predetermined low value below its nominal speed the signal processing circuitry is adapted to select for one part of the image lines derived from one film frame and for another part of the image lines derived from an adjacent film frame, there being a junction between the two parts defined by the line being scanned by the scan means at a particular instant.

19. Apparatus according to claim 18, in which the junction between the two parts is defined by the lines being instantaneously scanned.

20. Apparatus according to claim 18, in which the junction between the two parts is defined by the line being scanned at the beginning of each television field.

21. Apparatus according to claim 18, in which a blanked line or lines is formed at the junction.

22. Apparatus according to claim 18, in which the signal processing means comprises a sequential-to-interlace converter having an input and an output, and in which at least in one mode of operation of the apparatus the signal processing circuitry selects for application to a review output of the apparatus to provide a displayed picture the interlaced output of the converter for lines forming one part of the picture and the line at the input to the converter which is repeated to form another part of the picture.

23. Telecine apparatus comprising a film transport mechanism, scan means for line-by-line scanning of a film to provide a raster-scanned non-interlaced video output signal representative of a film image, and signal processing circuitry connected to the scan means and comprising a sequential-to-interlaced converter having an input and an output for converting the video output signal to an interlaced output signal, characterized in that at least in one mode of operation of the apparatus the signal processing circuitry selects for application to a review output of the apparatus to provide a displayed picture the interlaced output signal of the converter for lines forming one part of the picture and the line at the input to the converter which is repeated to form another part of the picture.

24. Telecine apparatus comprising:
a linear light sensor array;
a light source;
a film transport mechanism for moving film between the light source and the sensor array;
an optical system for imaging an illuminated section of film on the sensor array;
scan means for causing the light sensor array periodically to provide an output signal representative of an imaged film section;
scan control means for automatically varying the periodicity of operation of the scan means in response to an electrical signal;
a film speed measuring device coupled to the film transport mechanism to provide an output representative of the instantaneous film speed;
first compensating means connecting the output of the film speed measuring device to an input of the scan control means such that the line scanning is varied to compensate for fluctuations in the instantaneous film speed; and signal processing circuitry connected to the scan means and responsive to the output signal thereof and comprising a sequential-to-interlaced converter having an input and an interlaced output and comprising a digital store capable of storing at least one field, and second compensating means for compensating the magnitude of the output signal from the scan means in inverse relation to the instantaneous periodicity of the scan means;

the scan control means including means for detecting when the line scan rate required is less than a predetermined fraction of the nominal rate corresponding to normal viewing of the film and in response thereto the scan means increases the line scan rate by a factor m and the signal processing circuitry selects only one out of each m generated lines for subsequent processing;

the scan control means further including means for detecting when the line scan rate exceeds a predetermined maximum rate and in response thereto causing the scan means to decrease the scan rate by a factor m dependent upon the required line scan rate;

the signal processing circuitry, at least when the film is not moving above a predetermined low value below its normal speed, being adapted to select for one part of the image lines derived from one film frame and for another part of the image lines derived from an adjacent film frame, there being a junction between the two parts defined by the line being scanned by the scan means at a particular instant; and the signal processing circuitry, at least in one mode of operation of the apparatus, selecting for application to a review output of the apparatus to provide a displayed picture the interlaced output of the converter for lines forming one part of the picture and the line at the input to the converter which is repeated to form another part of the picture.

25. Apparatus according to claim 1, including means responsive to the passage of film frames through the film transport mechanism to provide framing pulses, and means responsive to the framing pulses to determine a measure of the precise film frame pitch of the film, whereby film shrinkage can be compensated.

26. Apparatus according to claim 25, in which the means for providing framing pulses comprises a sprocket roller and a shaft encoder coupled thereto.

27. Apparatus according to claim 1, including a user-operated control for inputting a value representing the desired height of the television image, and in which the scan control means is responsive to the said value to vary the line scan rate in response thereto.

28. Apparatus according to claim 2, in which the second compensating means additionally compensates for variations in element-to-element sensitivity in the sensor array.

29. Apparatus according to claim 3, in which each line selected by the signal processing means is arranged to be of substantially constant duration independent of changes in the said required line scan rate.

30. Apparatus according to claim 3, in which the factar m is a power of two.

31. Apparatus according to claim 4, in which the lines of each field of the output signal are derived from m/2 different film frames in a cyclical sequence.

32. Apparatus according to claim 4, in which the lines of each field of the output signal are derived from one film frame only and the signal processing circuitry is operative to generate m lines from each scanned line.

33. Apparatus according to claim 32, in which the output lines are derived by repeating lines from the said film frame.

34. Apparatus according to claim 32, in which the output lines are derived by interpolating from lines of the said film frame.

35. Apparatus according to claim 4, in which m is a power of two.

36. Apparatus according to claim 1, including signal processing circuitry connected to the output of the scan means and comprising a digital store capable of storing at least one field, and in which at least when the film is not moving above a predetermined low value below its nominal speed the signal processing circuitry is adapted to select for one part of the image lines derived from one film frame and for another part of the image lines derived from an adjacent film frame, there being a junction between the two parts defined by the line being scanned by the scan means at a particular instant.

37. Apparatus according to claim 36, in which the junction between the two parts is defined by the lines being instantaneously scanned.

38. Apparatus according to claim 36, in which the junction between the two parts is defined by the lines being scanned at the beginning of each television field.

39. Apparatus according to claim 36, in which a blanked line or lines is formed at the junction.

40. Apparatus according to claim 36, in which the signal processing means comprises a sequential-to-interlace converter, and in which at least in one mode of operation of the apparatus the signal processing circuitry selects for application to a review output of the apparatus to provide a displayed picture the interlaced output of the converter for lines forming one part of the picture and the line at the input to the converter which is repeated to form another part of the picture.

41. Apparatus according to claim 1, including signal processing circuitry connected to the output of the scan means and comprising a sequential-to-interlaced converter for converting the video signal to interlaced form, and in which at least in one mode of operation of the apparatus the signal processing circuitry selects for application to a review output of the apparatus to provide a displayed picture the interlaced output of the converter for lines forming one part of the picture and the line at the input to the converter which is repeated to form another part of the picture.

42. Apparatus according to claim 8, including signal processing circuitry connected to the output of the scan means and comprising a digital store capable of storing at least one field, and in which at least when the film is not moving above a predetermined low value below its nominal speed the signal processing circuitry is adapted to select for one part of the image lines derived from one film frame and for another part of the image lines derived from an adjacent film frame, there being a junction between the two parts defined by the lines being scanned by the scan means at a particular instant.

43. Apparatus according to claim 42, in which the junction between the two parts is defined by the lines being instantaneously scanned.

44. Apparatus according to claim 42, in which the junction between the two parts is defined by the line being scanned at the beginning of each television field.

45. Apparatus according to claim 42, in which a blanked line or lines is formed at the junction.

46. Apparatus according to claim 8, including signal processing circuitry connected to the output of the scan means and comprising a sequential-to-interlaced converter having an input and an output for converting the video signal to interlaced form, and in which at least in one mode of operation of the apparatus the signal processing circuitry selects for application to a review output of the apparatus to provide a displayed picture, the interlaced output of the converter for lines forming one part of the picture and the line at the input to the converter which is repeated forming another part of the picture.

47. Apparatus according to claim 12, including signal processing circuitry connected to the output of the scan means and comprising a digital store capable of storing at least one field, and in which at least when the film is not moving above a predetermined low value below its nominal speed the signal processing circuitry is adapted to select for one part of the image lines derived from one film frame and for another part of the image lines derived from an adjacent film frame, there being a junction between the two parts defined by the line being scanned by the scan means at a particular instant.

48. Apparatus according to claim 47, in which the junction between the two parts is defined by the lines being instantaneously scanned.

49. Apparatus according to claim 47, in which the junction between the two parts is defined by the line being scanned at the beginning of each television field.

50. Apparatus according to claim 47, in which a blanked line or lines is formed at the junction.

51. Apparatus according to claim 12, including signal processing circuitry connected to the output of the scan means and comparing a sequential-to-interlaced converter having an input and an output for converting the video signal to interlaced form, and in which at least in one mode of operation of the apparatus the signal processing circuitry selects for application to a review output of the apparatus to provide a displayed picture, the interlaced output of the converter for lines forming one part of the picture and the line at the input to the converter which is repeated to form another part of the picture.

* * * * *